(12) United States Patent
Xie et al.

(10) Patent No.: US 11,846,859 B2
(45) Date of Patent: Dec. 19, 2023

(54) DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventors: Feifei Xie, Shenzhen (CN); Mengyang Liu, Shenzhen (CN); Wuhui Wang, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 160 days.

(21) Appl. No.: 17/600,519

(22) PCT Filed: Jul. 26, 2021

(86) PCT No.: PCT/CN2021/108414
§ 371 (c)(1),
(2) Date: Sep. 30, 2021

(87) PCT Pub. No.: WO2023/000354
PCT Pub. Date: Jan. 26, 2023

(65) Prior Publication Data
US 2023/0205027 A1    Jun. 29, 2023

(30) Foreign Application Priority Data
Jul. 20, 2021   (CN) .......................... 202110816877.8

(51) Int. Cl.
*G02F 1/1368* (2006.01)
*G02F 1/1343* (2006.01)
*G02F 1/1362* (2006.01)

(52) U.S. Cl.
CPC ...... *G02F 1/1368* (2013.01); *G02F 1/134309* (2013.01); *G02F 1/136286* (2013.01)

(58) Field of Classification Search
CPC ............. G02F 1/1333; G02F 1/133345; G02F 1/1343; G02F 1/134309; G02F 1/1368; G02F 1/1362; G02F 1/136286
See application file for complete search history.

(56) References Cited

U.S. PATENT DOCUMENTS

| 10,598,995 | B2* | 3/2020 | Hao ................... H01L 27/0248 |
| 2007/0268440 | A1* | 11/2007 | Nagano ............. G02F 1/133753 349/141 |

(Continued)

FOREIGN PATENT DOCUMENTS

| CN | 101750809 A | 6/2010 |
| CN | 105932030 A | 9/2016 |

(Continued)

OTHER PUBLICATIONS

Patent Translate KR 20140042573.*

*Primary Examiner* — Thoi V Duong
(74) *Attorney, Agent, or Firm* — The Roy Gross Law Firm, LLC; Roy Gross

(57) ABSTRACT

A display panel is disclosed, including a substrate, a first metal layer, a first insulation layer, an active layer, and a second metal layer stacked sequentially, wherein the first metal layer includes a first electrode, the second metal layer includes a second electrode, the first electrode and the second electrode are partially overlapped to form a first overlapping region, a plurality of pads are disposed between the first insulation layer and the second metal layer, and a part of the pads are at least located in the first overlapping region, to improve an anti-static ability of the first electrode and the second electrode on an overlapping location.

11 Claims, 4 Drawing Sheets

(56) References Cited

U.S. PATENT DOCUMENTS

| | | | | |
|---|---|---|---|---|
| 2009/0086145 A1* | 4/2009 | Horiguchi | ......... | G02F 1/134363 |
| | | | | 349/187 |
| 2011/0133193 A1* | 6/2011 | Song | ................ | H01L 29/78669 |
| | | | | 257/E21.414 |
| 2020/0192168 A1 | 6/2020 | Oda et al. | | |

FOREIGN PATENT DOCUMENTS

| | | |
|---|---|---|
| CN | 107422559 A | 12/2017 |
| CN | 112258991 A | 1/2021 |
| KR | 20140042573 A | 4/2014 |

* cited by examiner

US 11,846,859 B2

DISPLAY PANEL

CROSS REFERENCE TO RELATED APPLICATIONS

This application is a National Phase of PCT Patent Application No. PCT/CN2021/108414 having International filing date of Jul. 26, 2021, which claims the benefit of priority of Chinese Application No. 202110816877.8 filed on Jul. 20, 2021. The contents of the above applications are all incorporated by reference as if fully set forth herein in their entirety.

FIELD OF INVENTION

The present invention relates to the field of display technologies, and in particular, to a display panel.

BACKGROUND OF INVENTION

The quantity of data lines of an 8K (about 8,000 columns of pixels) display product is two times that of data lines of a 4K (about 4,000 columns of pixels) display product. Therefore, metal wiring arrangement of the 8K display product is denser than that of the 4K display product, and electro-static discharge (ESD) is easier to occur in the 8K display product, to cause a display panel to be wounded.

It is found by an analysis of a cross curve of an ultra-high-definition display product, such as an 8K display product that, in addition to a case that the ESD easily occurs on an intersection of a scanning line and a data line, the ESD also easily occurs between a gate and each of a source and a drain, to cause line mura and point mura.

SUMMARY OF INVENTION

An embodiment of the present invention provides a display panel, to resolve the line mura and the point mura caused due to the case that ESD easily occurs between the gate and each of the source and the drain because of dense metal wiring arrangement in the conventional ultra-high-definition display product.

To resolve the above technical problems, the present embodiment of the present invention provides the following technical solutions:

An embodiment of the present invention provides a display panel, including:

a substrate;

a first metal layer, disposed on the substrate, the first metal layer including a first electrode and a plurality of first signal lines;

a first insulation layer, disposed on the first metal layer;

an active layer, disposed on the first insulation layer; and a second metal layer, disposed on the active layer, the second metal layer including a second electrode and a plurality of second signal lines intersected with the plurality of first signal lines, wherein, an orthographic projection of the first electrode on the substrate and an orthographic projection of the second electrode on the substrate are partially overlapped to form a first overlapping region, a plurality of spaced pads are disposed between the first insulation layer and the second metal layer, and a part of the pads are at least located in the first overlapping region;

the pads and the active layer are disposed on the same first insulation layer; and a third overlapping region is formed at intersections of the first signal lines and the second signal lines, and a part of the pads are further at least located in the third overlapping region.

In some embodiments of the present invention, an orthographic projection of the active layer on the substrate is located in the orthographic projection of the first electrode on the substrate, the orthographic projection of the active layer on the substrate and the orthographic projection of the first electrode on the substrate are partially overlapped to form a second overlapping region, and the first overlapping region includes a first sub-overlapping region overlapped with the second overlapping region and a second sub-overlapping region not overlapped with the second overlapping region, a part of the pads being at least located in the second sub-overlapping region.

In some embodiments of the present invention, the plurality of second signal lines are arranged along a first direction, the plurality of first signal lines are arranged along a second direction, the first direction is intersected with the second direction, a plurality of pixel regions are defined by the first signal lines and the second signal lines, and the active layer, the first electrode, the second electrode, and a part of the pads are located in the pixel regions.

In some embodiments of the present invention, the first signal lines include a scanning line and a common line, the second signal lines include a data line, the first electrode is a gate, and the second electrode includes a source and a drain.

In some embodiments of the present invention, the source comprises a first end portion, a first branch, and a second branch, the first end portion is electrically connected to the data line, the first branch and the second branch extend toward different directions from the first end portion, the first branch and the second branch are located in the first sub-overlapping region, at least a part of the first end portion is located in the second sub-overlapping region, and an orthographic projection of the part of the first end portion located in the second sub-overlapping region on the substrate is located in an orthographic projection of a corresponding pad on the substrate.

In some embodiments of the present invention, the drain includes a second end portion located between the first branch and the second branch and an extending portion extending toward a direction far away from the source from the second end portion, the second end portion is located in the first sub-overlapping region, at least a part of the extending portion is located in the second sub-overlapping region, and an orthographic projection of the part of the extending portion located in the second sub-overlapping region on the substrate is located in an orthographic projection of a corresponding pad on the substrate.

In some embodiments of the present invention, a part of the pads are in contact connection with the active layer.

In some embodiments of the present invention, a part of the pads and the active layer are disposed at an interval.

An embodiment of the present invention further provides a display panel, including:

a substrate;

a first metal layer, disposed on the substrate, the first metal layer including a first electrode;

a first insulation layer, disposed on the first metal layer;

an active layer, disposed on the first insulation layer; and a second metal layer, disposed on the active layer, the second metal layer including a second electrode, wherein, an orthographic projection of the first electrode on the substrate and an orthographic projection of the second electrode on the substrate are partially overlapped to form a first overlapping region, a plurality of spaced pads are disposed between the first insulation layer and the second metal layer, and a part of the pads are at least located in the first overlapping region.

In some embodiments of the present invention, an orthographic projection of the active layer on the substrate is located in the orthographic projection of the first electrode on the substrate, the orthographic projection of the active layer on the substrate and the orthographic projection of the first electrode on the substrate are partially overlapped to form a second overlapping region, and the first overlapping region includes a first sub-overlapping region overlapped with the second overlapping region and a second sub-overlapping region not overlapped with the second overlapping region, a part of the pads being at least located in the second sub-overlapping region.

In some embodiments of the present invention, the pads and the active layer are disposed on the same first insulation layer.

In some embodiments of the present invention, the second metal layer includes a plurality of second signal lines arranged along a first direction, the first metal layer includes a plurality of first signal lines arranged along a second direction, the first direction is intersected with the second direction, a plurality of pixel regions are defined by the first signal lines and the second signal lines, and the active layer, the first electrode, the second electrode, and a part of the pads are located in the pixel regions.

In some embodiments of the present invention, the first signal lines include a scanning line and a common line, the second signal lines include a data line, the first electrode is a gate, and the second electrode includes a source and a drain.

In some embodiments of the present invention, the source comprises a first end portion, a first branch, and a second branch, the first end portion is electrically connected to the data line, the first branch and the second branch extend toward different directions from the first end portion, the first branch and the second branch are located in the first sub-overlapping region, at least a part of the first end portion is located in the second sub-overlapping region, and an orthographic projection of the part of the first end portion located in the second sub-overlapping region on the substrate is located in an orthographic projection of a corresponding pad on the substrate.

In some embodiments of the present invention, the drain includes a second end portion located between the first branch and the second branch and an extending portion extending toward a direction far away from the source from the second end portion, the second end portion is located in the first sub-overlapping region, at least a part of the extending portion is located in the second sub-overlapping region, and an orthographic projection of the part of the extending portion located in the second sub-overlapping region on the substrate is located in an orthographic projection of a corresponding pad on the substrate.

In some embodiments of the present invention, a third overlapping region is formed at intersections of the first signal lines and the second signal lines, and a part of the pads are further at least located in the third overlapping region.

In some embodiments of the present invention, a part of the pads are in contact connection with the active layer.

In some embodiments of the present invention, a part of the pads and the active layer are disposed at an interval.

In some embodiments of the present invention, a film thickness of a part of the first insulation layer covered by the pads and the active layer is greater than that of a part of the first insulation layer not covered by the pads and the active layer.

In some embodiments of the present invention, materials of the pads and the active layer include any one of amorphous silicon, low-temperature poly-silicon, and a metal oxide.

Beneficial effects of the present invention are that the plurality of pads are disposed between the first insulation layer and the second metal layer, and the pads are disposed in the first overlapping region formed by the first electrode and the second electrode, which can enlarge an interval between the first electrode and the second electrode in a thickness direction, and improve an anti-static ability of the first electrode and the second electrode on an overlapping location.

Beneficial Effects

The plurality of pads are disposed between the first insulation layer and the second metal layer, and the pads are disposed in the first overlapping region formed by the first electrode and the second electrode, which can enlarge an interval between the first electrode and the second electrode in a thickness direction, and improve an anti-static ability of the first electrode and the second electrode on an overlapping location.

DETAILED DESCRIPTION OF PREFERRED EMBODIMENTS

The present disclosure provides a display panel, and to make the objectives, technical solutions, and effects of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

Figure 1:
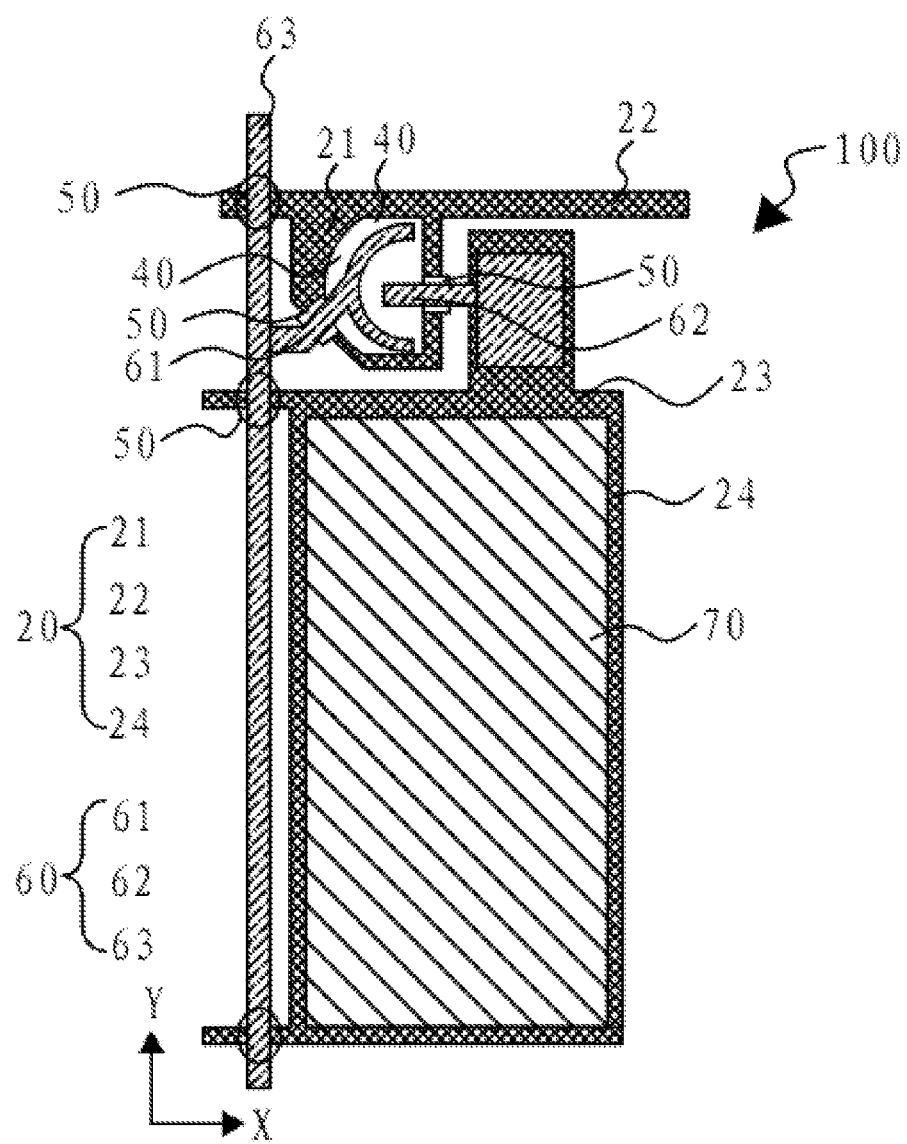
FIG. 1 is a schematic diagram of a plane of a display panel according to an embodiment of the present invention.
Figure 2:
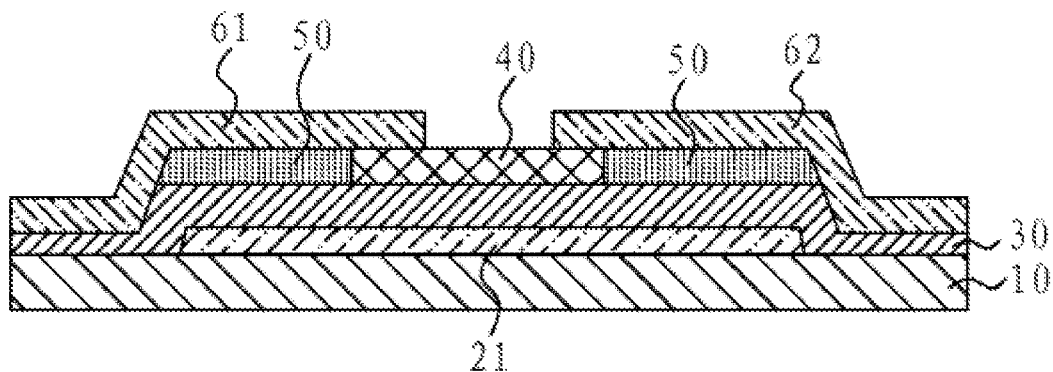
FIG. 2 is a schematic cross-sectional view of a thin film transistor according to an embodiment of the present invention.

FIG. 1 is a schematic diagram of a plane of a display panel according to an embodiment of the present invention, and FIG. 2 is a schematic cross-sectional view of a display panel according to an embodiment of the present invention. A display panel 100 provided by the present embodiment of the present invention can be a liquid crystal display panel, including a substrate 10, a first metal layer 20 disposed on the substrate 10, a first insulation layer 30 disposed on the first metal layer 20, an active layer 40 disposed on the first insulation layer 30, and a second metal layer 60 disposed on the active layer 40.

The first metal layer 20 includes a first electrode 21 and a plurality of first signal lines. In the present embodiment of the present invention, the first electrode 21 is a gate 21, and the first signal lines include a scanning line 22 and a common line 23. The second metal layer 60 includes a second electrode and a plurality of second signal lines, the second electrode includes a source 61 and a drain 62, and the second signal lines include a data line 63.

The first signal lines (for example, the scanning line 22 and the common line 23) extend along a first direction X, the plurality of first signal lines are arranged along a second direction Y, the second signal lines (for example, the data line 63) extend along the second direction Y, and the plurality of second signal lines are arranged along the first direction (only one second signal line is shown in FIG. 1). The first direction X is intersected with the second direction Y, and preferably, the first direction X is perpendicular to the second direction Y.

The first signal lines are intersected with the second signal lines to define a plurality of pixel regions. In details, the scanning line 22 is intersected with the data line 63 to define the plurality of pixel regions, and the display panel 100 includes a pixel circuit and a pixel unit located in the pixel regions. The pixel circuit includes at least one thin film transistor, and the thin film transistor includes the active layer 40, the gate 21, the source 61, and the drain 62.

The display panel 100 further includes a plurality of pads 50 arranged at an interval, and the pads 50 are disposed between the first insulation layer 30 and the second metal layer 60. The active layer 40, the first electrode, the second electrode, and a part of the pads 50 are located in the pixel regions.

Figure 3:
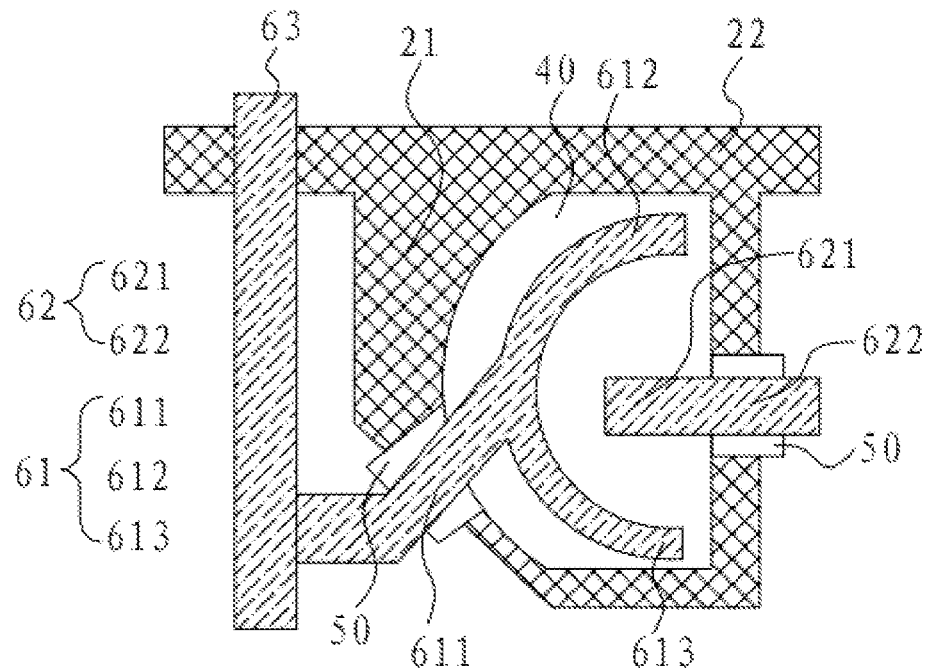
FIG. 3 is a schematic enlarged diagram of a plane of a thin film transistor according to an embodiment of the present invention.
Figure 4:
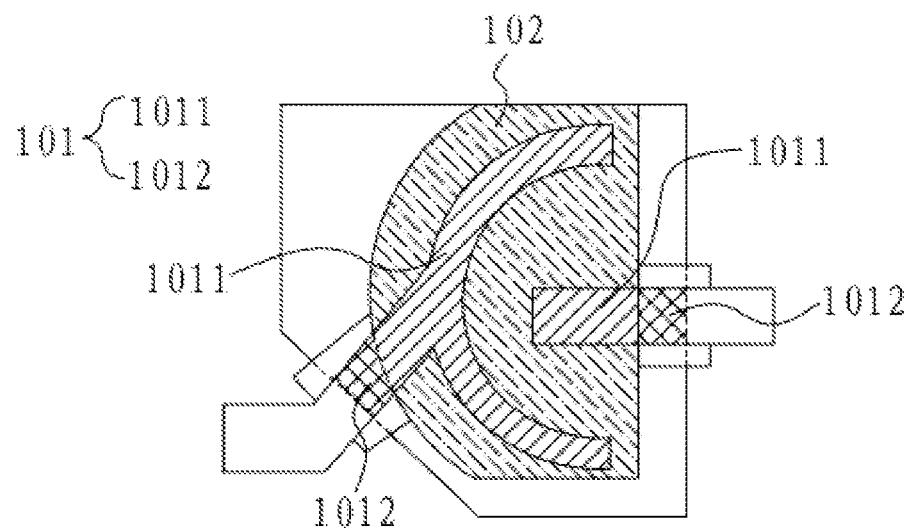
FIG. 4 is another schematic enlarged diagram of a plane of a thin film transistor according to an embodiment of the present invention.

FIG. 3 is a schematic enlarged diagram of a thin film transistor of a pixel circuit according to an embodiment of the present invention, and FIG. 4 is another schematic enlarged diagram of a thin film transistor of a pixel circuit according to an embodiment of the present invention. An orthographic projection of the first electrode 21 on the substrate 10 and an orthographic projection of the second electrode (for example, the source 61 and the drain 62) on the substrate are partially overlapped to form a first overlapping region 101, a part of the pads 50 are at least located in the first overlapping region 101, in other words, one part of the part of the pads 50 can be located in the first overlapping region 101, and an other part of the part of the pads 50 can be located outside the first overlapping region 101. A pad 50 corresponding to the first overlapping region 101 can enlarge an interval between the first electrode 21 and the second electrode in a thickness direction, and improve an anti-static ability of the first electrode and the second electrode on an overlapping location.

In the present embodiment of the present invention, a material of the active layer 40 includes any one of amorphous silicon, low-temperature poly-silicon, and a metal oxide.

Figure 5:
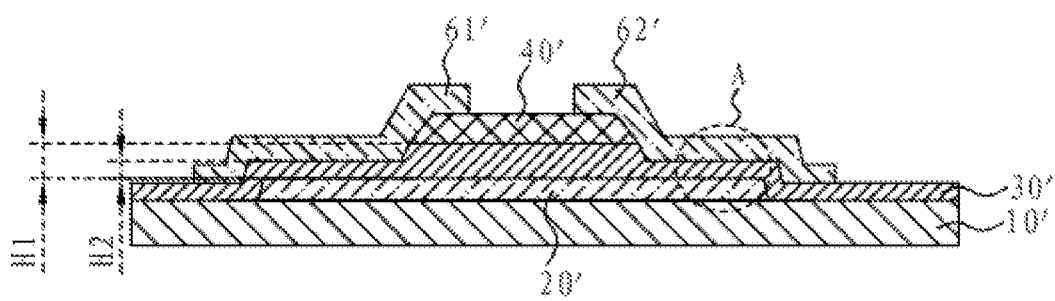
FIG. 5 is a schematic cross-sectional view of a thin film transistor in a conventional technology.

An amorphous silicon thin film transistor is described as an example in the present embodiment of the present invention, and FIG. 5 is a schematic cross-sectional view of an amorphous silicon thin film transistor in a conventional technology. A gate 20' is disposed on a substrate 10', a gate insulation layer 30' is disposed on the gate 20', an active layer 40' is disposed on the gate insulation layer 30', and a source 61' and a drain 62' are disposed on the active layer 40'. During preparation of the thin film transistor, in order to ensure that the amorphous silicon only exists in a specified region to form the active layer and the amorphous silicon is completely etched in other regions, an over-etching process can be performed after an amorphous silicon film layer is deposited on a whole surface. Through the over-etching process, amorphous silicon in regions other than a region in which the active layer 40' is located is over-etched, such that a part of a film layer can be further etched from a corresponding gate insulation layer 30' under the region, and a film layer thickness H1 of a gate insulation layer 30' not covered by the active layer 40' can be less than a film layer thickness H2 of a gate insulation layer 30' covered by the active layer 40'. Therefore, an overlapping part of the source 61', the drain 62', and the gate 20' in the thickness direction exists in a region A in which the thickness of the gate insulation layer 30' is reduced, and a phenomenon of ESD is easier to occur between each of the source 61' and the drain 62' and the gate 20' in the region A.

Referring to FIGS. 3 and 4, in the present embodiment of the present invention, an orthographic projection of the active layer 40 on the substrate 10 and an orthographic projection of the first electrode 21 on the substrate are partially overlapped to form a second overlapping region 102, and the orthographic projection of the active layer 40 on the substrate 10 is located in the orthographic projection of the first electrode 21 on the substrate 10, in other words, a size of the second overlapping region 102 is determined by the active layer, and an area of the second overlapping region 102 is equal to an area of the orthographic projection of the active layer 40 on the substrate 10. The first overlapping region 101 includes a first sub-overlapping region 1011 overlapped with the second overlapping region 102 and a second sub-overlapping region 1012 not overlapped with the second overlapping region 102, a part of the pads 50 being at least located in the second sub-overlapping region. Because the active layer exists in the second overlapping region 102, a gate insulation layer under the active layer will not be etched, and therefore the pads 50 can be unnecessarily disposed in the second overlapping region 102. However, the active layer is not disposed in the second sub-overlapping region 1012. Therefore, a gate insulation layer under the second sub-overlapping region 1012 can be partially etched, such that a film thickness of the gate insulation layer of the second sub-overlapping region 1012 is reduced. Consequently, the ESD is easier to occur in an overlapping part of the first electrode 21 and the second electrode in the second sub-overlapping region 1012, such that the pads 50 are at least disposed in the second sub-overlapping region 1012 to improve the anti-static ability of the first electrode and the second electrode on the overlapping location.

Referring to FIG. 2, in the present embodiment of the present invention, the pads 50 and the active layer 40 are disposed on the same first insulation layer 30, and a thickness of the pads 50 is consistent with a thickness of the active layer 40, such that an entire thickness of the display panel 100 is not increased.

Further, a material of the pads 50 can be same as that of the active layer 40, and the material of the pads 50 includes any one of the amorphous silicon, the low-temperature poly-silicon, and the metal oxide.

The pads 50 can be formed together with the active layer 40 through a same masking process, which neither adds a new masking process, nor affects the entire thickness of the display panel 100. In details, after the amorphous silicon film layer and an N+ type doped amorphous silicon layer are sequentially deposited on a whole surface on the first insulation layer 30, the amorphous silicon film layer and the N+ type doped amorphous silicon layer are etched, to form the pads 50 and the active layer 40 in a corresponding region. The first insulation layer 30 covered by the pads 50 and the active layer 40 can not be etched, and a thickness thereof can not be affected, and a film thickness of a part of the first insulation layer 30 covered by the pads 50 and the active layer 40 is greater than that of a part of the first insulation layer 30 not covered by the pads 50 and the active layer 40. Therefore, a probability that the ESD occurs in the overlapping part of the first electrode 21 and the second electrode (61 or 62) corresponding to the pads 50 can be reduced.

On the active layer 40 and the first insulation layer 30, a film layer can be deposited by a chemical vapor deposition method, which provides good uniformity for the deposited film layer.

Referring to FIGS. 3 and 4, the source 61 includes a first end portion 611, a first branch 612 and a second branch 613, the first end portion 611 is electrically connected to the data line 63, the first branch 612 and the second branch 613 extend toward different directions from the first end portion 611, the first branch 612 and the second branch 613 are located in the first sub-overlapping region 1011, at least a part of the first end portion 611 is located in the second sub-overlapping region 1012, and an orthographic projection of the part of the first end portion 611 located in the second sub-overlapping region 1012 on the substrate 10 is located in an orthographic projection of a corresponding pad 50 on the substrate 10. The active layer 40 is provided in the first sub-overlapping region 1011 in which the first branch 612 and the second branch 613 of the source 61 are located, and the at least a part of the first end portion 611 of the source 61 is located in the second sub-overlapping region 1012. Therefore, a place of a maximum probability that the ESD occurs between the source 61 and the first electrode 21 is at an overlapping position of the part of the first end portion 611 located in the second sub-overlapping region 1012 and the first electrode 21. Therefore, the corresponding pad 50 only requires to be disposed on a location corresponding to the first end portion 611.

Referring to FIGS. 3 and 4, the drain 62 includes a second end portion 621 located between the first branch 612 and the second branch 613 and an extending portion 622 extending toward a direction far away from the source 61 from the second end portion 621, the second end portion 621 is located in the first sub-overlapping region 1011, at least a part of the extending portion 622 is located in the second sub-overlapping region 1012, and an orthographic projection of the part of the extending portion 622 located in the second sub-overlapping region 1012 on the substrate 10 is located in an orthographic projection of a corresponding pad 50 on the substrate 10. The active layer 40 is provided in the first sub-overlapping region 1011 in which the second end portion 621 is located, and at least one part of the extending portion 622 is located in the second sub-overlapping region 1012 without the active layer. Therefore, a place of a maximum probability that the ESD occurs between the drain 62 and the first electrode 21 is at an overlapping position of the extending portion 622 and the first electrode. Therefore, the corresponding pad 50 only requires to be disposed on a location corresponding to the extending portion 622.

Referring to FIGS. 1 and 3, the display panel 100 can further include a pixel electrode 70 disposed on the second metal layer 60, and the pixel electrode 70 is located in the pixel regions. The first metal layer 20 can further include a common electrode 24 electrically connected to the common line 23. A via hole is disposed on the first insulation layer 30, the extending portion 622 is electrically connected, through the via hole, to the common line 23 electrically connected to the common electrode 24, and storage capacitance is formed between the pixel electrode 70 and the common electrode 24. The scanning line 22 transmits a scanning signal, and the data line 63 transmits a driving voltage signal, to charge the pixel electrode 70.

Referring to FIGS. 2 and 3, in some embodiments of the present invention, the pad 50 corresponding to the second sub-overlapping region 1012 can be in contact connection with the active layer 40, in other words, during etching, the pad 50 and the active layer 40 form a continuous pattern.

Figure 6:
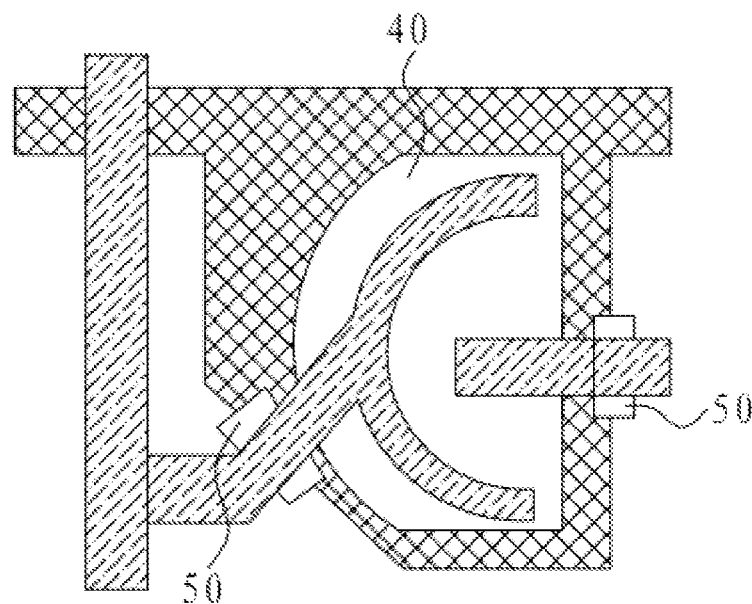
FIG. 6 is a schematic enlarged diagram of a plane of a thin film transistor according to another embodiment of the present invention.

Referring to FIG. 6, in another embodiment of the present invention, the pad 50 corresponding to the second sub-overlapping region 1012 and the active layer 40 can be disposed at an interval.

Figure 7:
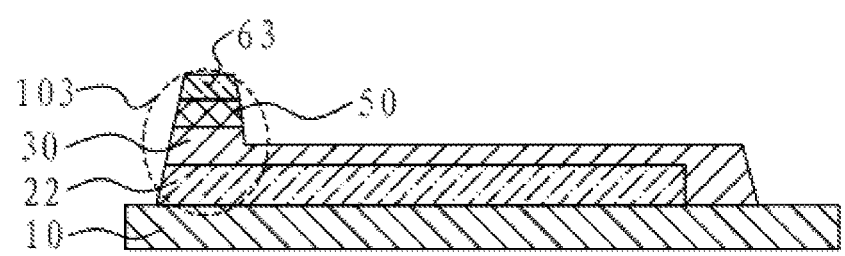
FIG. 7 is a schematic cross-sectional view of an intersection of a data line and a scanning line according to an embodiment of the present invention.

Referring to FIGS. 1 and 7, FIG. 7 is a schematic cross-sectional view of an intersection of a data line and a scanning line. Because the ESD can further occur on intersections of the first signal lines and the second signal lines, a part of the pads 50 can be further disposed at the intersections, for example, the part of the pads 50 is further disposed at an intersection of the data line 63 and the scanning line 22 and an intersection of the data line 63 and the common line 23. In details, a third overlapping region 103 is formed at the intersections of the first signal lines and the second signal lines, and the part of the pads 50 can be further located in the third overlapping region 103. An orthographic projection of overlapping parts of the first signal lines and the second signal lines in the thickness direction on the substrate 10 is located in an orthographic projection of a corresponding pad 50 on the substrate 10, to increase the thickness of the corresponding first insulation layer 30 under the pad 50.

For the display panel provided by the present embodiment of the present invention, the pad is disposed in the overlapping position of the first electrode and the second electrode, and the pads are disposed on the intersections of the first signal lines and the second signal lines, which can enlarge the interval between the first electrode and the second electrode in the thickness direction, and an interval between the overlapping parts of the first signal lines and the second signal lines, to further improve the anti-static ability of the first electrode and the second electrode on the overlapping location and an anti-static ability of the first signal lines and the second signal lines on overlapping locations. In addition, being disposed at the same layer, the pads and the active layer can be formed through a same masking process, thereby improving an anti-static ability of the display panel without adding a new film layer preparation process.

It can be understood that, any equivalent replacement or modification made by a person of ordinary skill in the art according to the technical solution and the inventive concept of the present disclosure shall fall within the protection scope of the appended claims of the present disclosure.

What is claimed is:

1. A display panel, comprising:
   a substrate;
   a first metal layer, disposed on the substrate, the first metal layer comprising a first electrode and a plurality of first signal lines;
   a first insulation layer, disposed on the first metal layer;
   an active layer, disposed on the first insulation layer; and a second metal layer, disposed on the active layer, the second metal layer including a second electrode and a plurality of second signal lines intersected with the plurality of first signal lines, wherein an orthographic projection of the first electrode on the substrate and an orthographic projection of the second electrode on the substrate are partially overlapped to form a first overlapping region, a plurality of spaced pads are disposed between the first insulation layer and the second metal layer, and a part of the pads are at least located in the first overlapping region;

the pads and the active layer are disposed on the same first insulation layer; and a third overlapping region is formed at intersections of the first signal lines and the second signal lines, and a part of the pads are further at least located in the third overlapping region, wherein an orthographic projection of the active layer on the substrate is located in the orthographic projection of the first electrode on the substrate, the orthographic projection of the active layer on the substrate and the orthographic projection of the first electrode on the substrate are partially overlapped to form a second overlapping region, and the first overlapping region comprises a first sub-overlapping region overlapped with the second overlapping region and a second sub-overlapping region not overlapped with the second overlapping region, a part of the pads being at least located in the second sub-overlapping region;

wherein the plurality of second signal lines are arranged along a first direction, the plurality of first signal lines are arranged along a second direction, the first direction is intersected with the second direction, a plurality of pixel regions are defined by the first signal lines and the second signal lines, and the active layer, the first electrode, the second electrode, and a part of the pads are located in the pixel regions, wherein the first signal lines comprise a scanning line and a common line, the second signal lines comprise a data line, the first electrode is a gate, and the second electrode comprises a source and a drain, wherein the source comprises a first end portion, a first branch, and a second branch, the first end portion is electrically connected to the data line, the first branch and the second branch extend toward different directions from the first end portion, the first branch and the second branch are located in the first sub-overlapping region, at least a part of the first end portion is located in the second sub-overlapping region, and an orthographic projection of the part of the first end portion located in the second sub-overlapping region on the substrate is located in an orthographic projection of a corresponding pad on the substrate.

2. The display panel as claimed in claim 1, wherein the drain comprises a second end portion located between the first branch and the second branch and an extending portion extending toward a direction far away from the source from the second end portion, the second end portion is located in the first sub-overlapping region, at least a part of the extending portion is located in the second sub-overlapping region, and an orthographic projection of the part of the extending portion located in the second sub-overlapping region on the substrate is located in an orthographic projection of a corresponding pad on the substrate.

3. The display panel as claimed in claim 1, wherein a part of the pads are in contact connection with the active layer.

4. The display panel as claimed in claim 1, wherein a part of the pads and the active layer are disposed at an interval.

5. A display panel, comprising:
a substrate;
a first metal layer, disposed on the substrate, the first metal layer comprising a first electrode;
a first insulation layer, disposed on the first metal layer;
an active layer, disposed on the first insulation layer; and
a second metal layer, disposed on the active layer, the second metal layer comprising a second electrode, wherein an orthographic projection of the first electrode on the substrate and an orthographic projection of the second electrode on the substrate are partially overlapped to form a first overlapping region, a plurality of spaced pads are disposed between the first insulation layer and the second metal layer, and a part of the pads are at least located in the first overlapping region, wherein an orthographic projection of the active layer on the substrate is located in the orthographic projection of the first electrode on the substrate, the orthographic projection of the active layer on the substrate and the orthographic projection of the first electrode on the substrate are partially overlapped to form a second overlapping region, and the first overlapping region comprises a first sub-overlapping region overlapped with the second overlapping region and a second sub-overlapping region not overlapped with the second overlapping region, a part of the pads being at least located in the second sub-overlapping region;

wherein the plurality of second signal lines are arranged along a first direction, the plurality of first signal lines are arranged along a second direction, the first direction is intersected with the second direction, a plurality of pixel regions are defined by the first signal lines and the second signal lines, and the active layer, the first electrode, the second electrode, and a part of the pads are located in the pixel regions, wherein the first signal lines comprise a scanning line and a common line, the second signal lines comprise a data line, the first electrode is a gate, and the second electrode comprises a source and a drain, wherein the source comprises a first end portion, a first branch, and a second branch, the first end portion is electrically connected to the data line, the first branch and the second branch extend toward different directions from the first end portion, the first branch and the second branch are located in the first sub-overlapping region, at least a part of the first end portion is located in the second sub-overlapping region, and an orthographic projection of the part of the first end portion located in the second sub-overlapping region on the substrate is located in an orthographic projection of a corresponding pad on the substrate.

6. The display panel as claimed in claim 5, wherein the drain comprises a second end portion located between the first branch and the second branch and an extending portion extending toward a direction far away from the source from the second end portion, the second end portion is located in the first sub-overlapping region, at least a part of the extending portion is located in the second sub-overlapping region, and an orthographic projection of the part of the extending portion located in the second sub-overlapping region on the substrate is located in an orthographic projection of a corresponding pad on the substrate.

7. The display panel as claimed in claim 5, wherein a third overlapping region is formed at intersections of the first signal lines and the second signal lines, and a part of the pads are further at least located in the third overlapping region.

8. The display panel as claimed in claim 5, wherein a part of the pads are in contact connection with the active layer.

9. The display panel as claimed in claim 5, wherein a part of the pads and the active layer are disposed at an interval.

10. The display panel as claimed in claim 5, wherein a film thickness of a part of the first insulation layer covered by the pads and the active layer is greater than that of a part of the first insulation layer not covered by the pads and the active layer.

11. The display panel as claimed in claim 5, wherein materials of the pads and the active layer comprise any one of amorphous silicon, low-temperature poly-silicon, and a metal oxide.

* * * * *